Inventor:
Phillip Gilbert Thomas

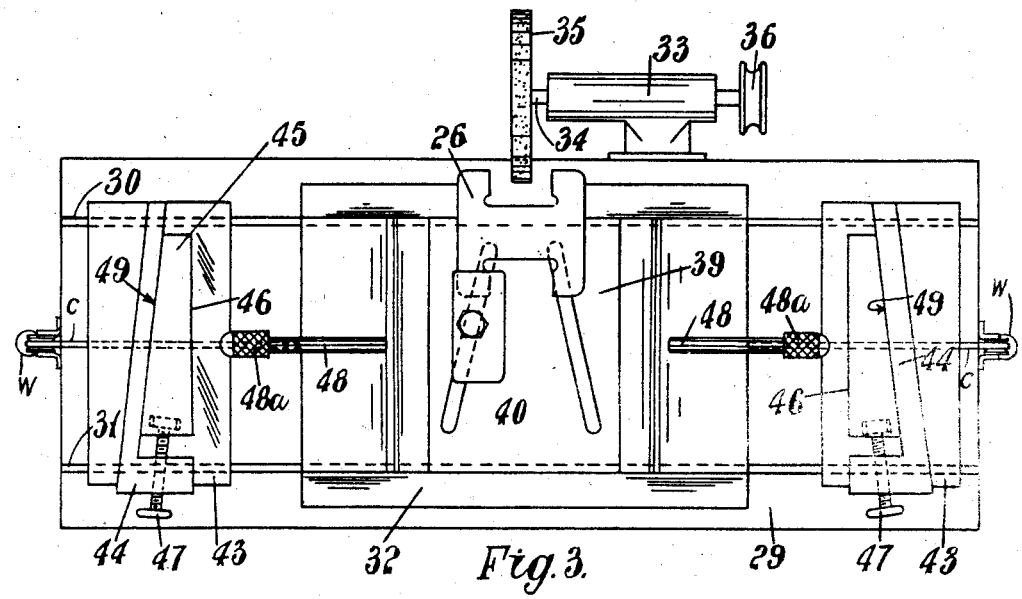
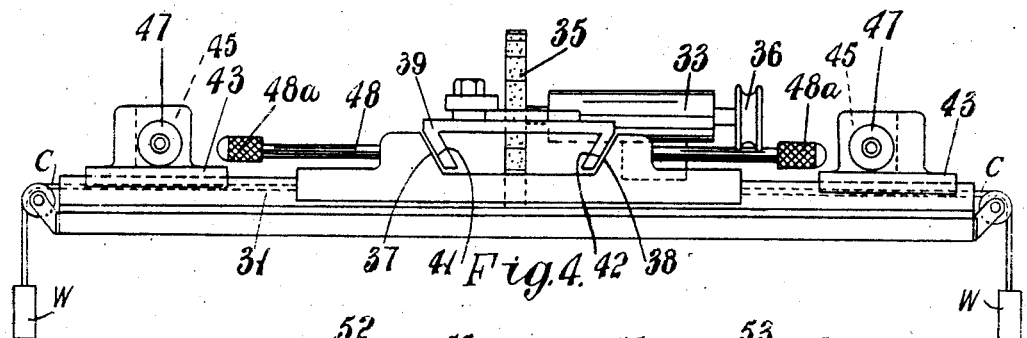
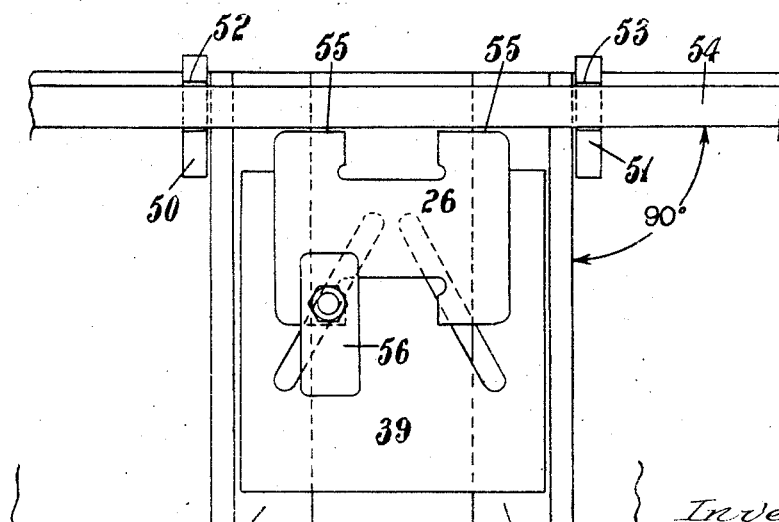

Patented June 29, 1943

2,322,896

UNITED STATES PATENT OFFICE 2,322,896

GRINDING AND/OR LAPPING MACHINE

Phillip Gilbert Thomas, Park Rise, Leatherhead, England

Application May 13, 1942, Serial No. 442,747
In Great Britain September 27, 1941

20 Claims. (Cl. 51—98)

This invention relates to improved machines for grinding and (or) lapping workpieces and particularly for grinding and (or) lapping gauges. For simplicity, reference will be made hereinafter to the grinding and (or) lapping of gauges, both operations being termed "grinding."

It is well known that gauges used in the manufacture of precision machines and apparatus form a considerable item in the cost thereof. Large numbers of gauges of the well known caliper type are finished by grinding, and the constant demand for increased accuracy has resulted in two sharply defined methods of manufacture of such gauges. By one method the gauges are ground as nearly as possible to size on a machine which is not usually specially adapted for the purpose, the gauges then being finished off by hand. By the other method gauges are finished by grinding on machines which are specially adapted for the work but which are expensive.

The greatest difficulties in gauge production are accurate measurement during manufacture, and accurate adjustment of the machine by whatever means are provided to enable the operator to finish the gauge to the required size, with a high degree of accuracy, as expeditiously as possible.

The degree of accuracy required is such that even with highly skilled operators, a gauge is frequently spoilt owing to the impossibility of replacing the gauge on the machine in a correct position, once it has been removed. For this reason, some special machines are fitted with integral measuring apparatus, one objection to which is the great increase in the cost, especially as each machine must be so fitted instead of one measuring instrument serving several machines.

The present invention is intended to overcome these objections in a better and cheaper manner than heretofore.

According to the present invention, a machine for grinding and (or) lapping gauges is characterised in that the gauge is supported by a detachably mounted carried which is slidable towards and from the grinding or lapping wheel and which may be freely removed from, and replaced on, the machine with the gauge secured thereto, in order that the gauge may be meausured or for other purposes, without disturbing the position of the gauge on the carrier. The gauge carrier can be so constructed that it is invertible in order that the two faces of a gauge can be ground or lapped without removing the gauge from the carrier and by inverting the latter.

One constructional form of the invention comprises a grinding or lapping wheel which is movable axially for effecting the coarse adjustment of the wheel relatively to the face of the gauge to be ground or lapped. The grinding or lapping wheel may also be adjustable vertically. The gauge is mounted on a slidable carrier which is adapted to move the gauge towards and away from the grinding or lapping wheel and which, when being moved relatively to the wheel, is kept pressed against an adjusting member for effecting the fine adjustment of the said face of the gauge relatively to the wheel by moving the carrier laterally.

In this construction, the carrier is slidably mounted upon a bed or equivalent, and the said adjusting member consists of a slidable wedge, which may be resiliently held against an adjustable abutment and guided thereby in its movement towards and from the axis of the grinding or lapping wheel.

A modified form of machine comprises a gauge carrier which is movable at a right angle towards and away from the axis of the grinding or lapping wheel on a saddle which, in turn, is mounted on a bed for movement in a direction parallel to the axis of the wheel. Located transversely of the bed and spaced from the saddle is at least one adjustable wedge, the straight face of which is adapted to be engaged by an adjustable thimble or equivalent provided at the end of a stop rod projecting from the adjacent end of the saddle. The arrangement is such that the thimble or equivalent can be set to provide a coarse adjustment to control the distance travelled by the saddle in one direction along the bed and, therefore, the approximate position of the gauge, the fine adjustment of the face to be ground or lapped relative to the wheel being obtained by adjusting the wedge against which the thimble or equivalent engages.

In any construction, the carrier or the said stop rod, as the case may be, may be pressed manually against the wedge, or the pressure may be obtained by mechanical or spring means.

Constructional forms of the invention are hereinafter described, by way of example, with reference to the accompanying drawings, whereon:

Figures 3 and 4 are plan and front views respectively of a modified machine, and Figure 5 shows an addition to the machine illustrated in Figures 3 and 4.

Figure 1:
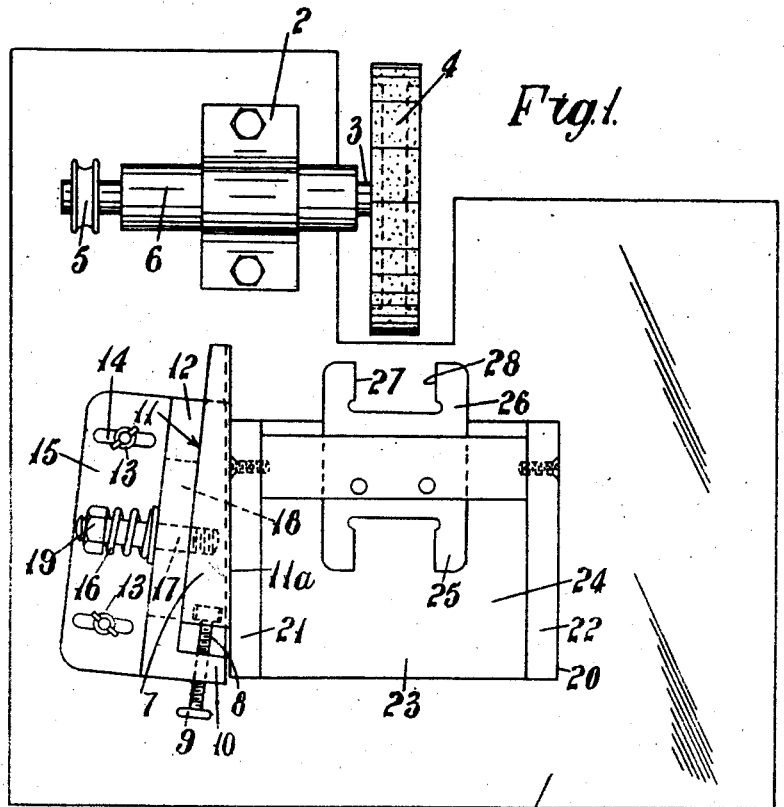
Figures 1 and 2 are plan and front views respectively of one machine which comprises a single adjusting wedge, and in which the gauge-carrier is capable of being inverted so that an opposite face of the gauge can be ground without detaching the gauge from the carrier.
Figure 2:
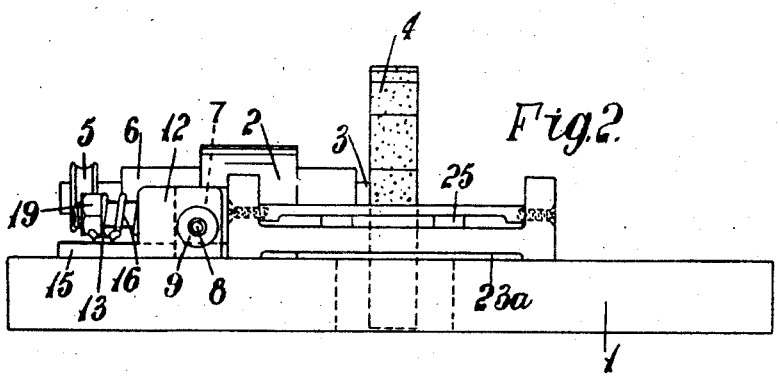

The constructional form of the invention shown in Figures 1 and 2 comprises a bed or table 1 to which the grinding wheel spindle bearing 2, which may be adjustable vertically, is secured at the rear of the bed and to one side of the centre thereof. The grinding wheel spindle 3 is provided with a grinding wheel 4 at one end and with a driving pulley 5 at the opposite end, the wheel being situated substantially centrally of the bed 1. The wheel revolves in a true vertical plane and its spindle 3, which is horizontal and parallel to the back and front of the bed, is adapted to be moved axially in its bearing housing 6 so as to obtain a rough lateral adjustment of the grinding wheel to suit different sizes of gauges, means (not shown) being provided for locking the spindle in its adjusted positions.

An adjusting wedge or tapered strip 7 is mounted on the machined upper surface of a plate 15 adjustably mounted on the bed and the wedge is adapted to be adjusted longitudinally towards and away from the spindle 3 by means of a screwed adjusting member 8 having a knurled operating knob 9. The said member is screwed through a screw-threaded hole in a lug 10 projecting upwards from the plate 15, and the inner end of the member 8 is suitably attached to the wedge. The inclined face 11 of the latter is adapted to slide in contact with the inner machined face of a vertical flange 12, forming an angular abutment and projecting upwards from the plate 15, which latter is adapted to be adjusted towards and away from the centre of the bed 1, to conform with the size of the gauge, and to be fixed in its adjusted positions by means of nuts screwed on to holding-down bolts 13 engaged in spaced elongated slots 14 formed in the base of the plate. The said inclined face 11 is kept in contact with the said machined inner face of the abutment 12 by means of a spring 16 which is mounted upon a stud 17 screwed into the wedge at its inner end and passing through an elongated slot 18 formed in the abutment. The said spring 16 bears against the outer face of the abutment 12 at one end and against a nut 19, screwed upon the stud, at its opposite end. The opposite face 11A of the wedge is straight and, when the said abutment is properly adjusted, is at a true right angle to the axis of the spindle 3. From the above description, it will be clear that the wedge is capable of movement across the bed by longitudinal adjustment towards and from the spindle 3, its face 11A always remaining at right angles to the spindle.

There are many ways of measuring the longitudinal adjustment (and therefore the lateral movement) of the wedge. For example, this may be arrived at by vernier graduations on the abutment 12 and wedge 7 or a micrometer dial indicator of known construction mounted on the wedge and adapted to cooperate with a stop on the abutment.

The machine also comprises a gauge-carrier 20 which is of shallow U- or channel section and which comprises vertical walls 21 and 22 and a base 23. The lower face of the base and also the top surfaces of the said walls are accurately machined so that the carrier is freely slidable upon the bed both when in the position in which it is shown in the drawings and when it is inverted. The lower face of the base 23 is recessed as indicated at 23a in Figure 2 so that the actual area of contact between the carrier 20 and the bel 1 is the same which ever way up the carrier is used. It will be noted that when the carrier 20 is inverted the gauge is located below the base but this is quite immaterial and has no effect on the grinding operation. The carrier is not fixed to the bed but is held down thereon by its own weight. The external faces of the walls 21 and 22 of the carrier are accurately machined so that they are parallel to each other and so that both are at right angles to the front and rear ends of the carrier and to the axis of the spindle 3 when the face 21 or 22 is in contact with the face 11a of the wedge. In the use of the machine, the carrier is accurately guided towards and from the grinding wheel by the engagement of the external surface of the wall 21 or 22 with the face 11a of the wedge.

The upper surface 24 of the carrier is also accurately machined and the gauge 25 is clamped upon said surface in a position substantially midway between the walls 21 and 22, and with that end 26 to be operated upon projecting to the rear beyond the rear edge of the carrier.

After the grinding wheel 4 and the abutment member have been adjusted to suit the size of gauge to be operated upon, the carrier, with the gauge fixed thereon, is laid on the bed with the external face of the wall 21 in contact with the straight face 11a of the wedge. The carrier is then pushed by hand towards the grinding wheel and the required amount to be removed from the face 27 is fixed by moving the wedge away from the operator and thus adjusting the face 27 nearer to the working face of the wheel, the reading of the measuring instrument being observed in the meantime. In order to grind the other face 28 of the gauge, the carrier is inverted and the same operation of adjusting by means of the wedge 7 is repeated, the face 28 also being ground with an accuracy that depends on the true parallelism of the external faces of the walls 21 and 22, the flatness of the face 11a of the adjusting wedge, and the disposition of the latter at a true right angle to the axis of the spindle 3. The same operations are repeated for grinding the opposite faces of the gauge, the latter being removed from the carrier and turned around.

In using the above described machine, the external face of the wall 21 or 22, as the case may be, must be kept pressed manually hard against the face 11a of the wedge. The modified construction of machine shown in Figures 3 and 4 obviates the necessity for maintaining this manual pressure. The machine comprises a bed 29 which is formed with upwardly-projecting parallel ways 30 and 31 on which a saddle 32 is slidably mounted for movement longitudinally of the bed. The bearing bracket 33 of the spindle 34 of the grinding wheel 35 is provided at the back of the bed behind the rear way 30 and is so disposed that the axis of the spindle is exactly parallel to the ways and, therefore, to the path of movement of the saddle along the ways. It may be found to be preferable to make the said bearing bracket adjustable vertically. As in the preceding construction, a pulley 36 is mounted at the opposite end of the spindle. The saddle is formed with inclined ways 37 and 38 which are exactly at right angles to the ways 30 and 31 and thus to the axis of the spindle 34. A gauge carrier 39 is detachably mounted and slidably guided on the saddle for movement towards and from the grinding wheel, said carrier comprising a carrier plate 40 and two inclined side walls 41 and 42, which are machined to engage with and are slidably guided in the ways 37 and 38. The carrier can only be moved laterally relatively to the bed in company with the saddle. On each side of the saddle an abutment member 43 is mounted upon the ways 30 and 31 and means are provided for fixing the member 43 against movement relatively to the bed. Each of the said abutment members 43 comprises a bracket 44, the inner wall of which is accurately machined and which is disposed at an angle greater than a right angle, e. g., at 95°, to the axis of the spindle 34. A wedge 45 is slidably arranged on each of the brackets 44 with its inclined face 49 in contact with the machined inner wall of the bracket, its other face 46 then being at a right angle to the axis of the spindle 34. As in the preceding construction, each wedge 45 is adapted to be adjusted towards and from the axis of the spindle 34 by a screw thread adjustment means including an operating handwheel 47, the amount of the adjustment being measured by measuring means such as those referred to above. Spring means (not shown) like those shown in Figure 1 are provided for holding the wedge in contact with the face 49.

A laterally extending rod 48 is provided at each side of the saddle. Each rod is adjustable relatively to the saddle and has threaded on to its outer end an adjustable thimble 48a, one thimble being adapted to cooperate with the face 46 of the wedge on the left of the saddle and the other with the face 46 of the other wedge, the said faces thus forming stops limiting the movement of the saddle along the ways 30 and 31, respectively to the left and to the right. Each thimble 48a is held in contact with the respective face 46 by means including a weight W suspended at the corresponding end of the bed by a wire, chain or equivalent C, the opposite end of which is attached to the saddle, means being provided for putting one weight out of action while the other is being used. In view of the inclination of the face 49, each face 46 and the corresponding thimble form an initial coarse adjustment for positioning the left and right hand faces of the gauge roughly relatively to the corresponding grinding face of the grinding wheel. The fine adjustment of each of the two faces relative to the grinding wheel is carried out by adjusting the wedges backwards or forwards towards or from the axis of the spindle 34, the corresponding working face of the gauge thus being accurately adjusted with relation to the face of the grinding wheel. In the machine now being described, the left hand wedge controls the amount ground from the right hand face of the gauge and the right hand wedge the amount ground from the left hand face of the gauge. In order to increase the amount of metal ground from the faces, the wedges are drawn back towards the operator thus allowing the saddle to be pulled to the right or left.

The grinding operation is carried out by pushing the carrier towards the grinding wheel. The carrier can then be removed from the saddle in order that the gauge can be examined and measured. If necessary, the carrier can then again be arranged on the saddle when, obviously, the carrier and the gauge can be made to occupy the same positions relative to the grinding wheel.

In the case of either of the machines described above, a stop may be provided for limiting the forward movement of the carrier so as to prevent the grinding wheel gashing the bottom of the gauge between the two working edges of the gauge.

An addition to the machine of Figures 3 and 4 is shown in Figure 5, which illustrates means for setting the gauge accurately square to the ways 37 and 38, and thus to the working faces of the grinding wheel. Two upstanding lugs 50 and 51 are provided on the saddle on opposite sides of the carrier 39, and are respectively formed with recesses 52 and 53, each of which is disposed at an exact right angle to the said ways. In setting up the gauge, a straight edge 54 is arranged in the said recesses and the gauge 26 is set up on the carrier so that its front edge 55 contacts with the rear edge of the straight edge. Thereafter, the gauge is fixed on the carrier by means of two clamps, one of which is shown at 56.

With a machine constructed according to the drawings, it is possible to transfer the carrier of one machine to another machine having a different kind of grinding or lapping wheel.

Various modifications of the constructional forms of the invention are possible. Thus, the carrier of the construction shown in Figures 1 and 2 could be kept in contact with the adjacent face of the wedge by weight means, as described above in connection with Figures 3 and 4, or by spring means, and spring means could also replace the weight means in the construction of Figures 3 and 4.

The construction of Figures 3 and 4 could comprise two separate coaxial stop rods 48 screw-threaded at their inner ends into holes formed in the saddle and thus independently adjustable. On the other hand, the said rods could be arranged on spaced axes and connected by a clamp, whereby the two rods could be adjusted in company.

One advantage of using two stop rods such as 48 is that once the wedges, rods and thimbles have been set for a gauge of a particular size, any number of gauges of that size can be ground or lapped to the required dimension without disturbing the wedges, rods and thimbles, the two thimbles then acting in the manner of an internal caliper in association with the faces of the wedges.

It will be understood that only one stop rod 48 need be provided (or used) on the saddle.

The lateral movement of the carrier in Figures 1 and 2 and of the saddle in Figures 3 and 4, can also be measured by means of a cooperating micrometer scale arranged on the abutment member and the operating knob or wheel for adjusting the wedges longitudinally.

The wedges may also be built up, that is to say, instead of using a solid wedge, the wedge member may comprise two plates spaced apart at one end by a tapered block and at the other end by a larger tapered block, with which latter, the wedge adjusting screw is engaged.

One advantage of providing the machine with a detachable gauge carrier is that two machines can be used for roughing and finishing respectively, or three or more machines may be used for roughing, finishing and super-finishing, or lapping with diamond or other abrasive in one or more grades.

In order to accommodate larger gauges, the machine may be provided with two grinding heads, arranged co-axially at a spaced distance apart which may be variable.

It will be appreciated that in some cases it may be possible to construct the gauge carrier in such a way that it will be possible to grind the working faces of a two ended gauge without the necessity of removing the gauge from the carrier.

The gauge-carrier 39 of Figures 3 and 4 may be so constructed that, like the carrier of Figures 1 and 2, it can be inverted and replaced on the saddle.

It will also be understood that the invention is applicable to existing grinding or lapping machines.

I claim:

1. A machine for grinding gauges, comprising a grinding wheel, means for turnably supporting the grinding wheel, a gauge-carrier adapted to be detachably mounted on said machine and to slide thereon towards and from the grinding wheel, means for guiding the gauge-carrier in its slidable movement and for fixing the path of said slidable movement, and means for detachably securing a gauge to the carrier, said carrier being freely removable from said machine in order to measure the gauge or for other purposes and replaceable thereon against said guiding means without disturbing the position of the gauge on the carrier, and the path of movement of the latter towards and from the grinding wheel, and said carrier being invertible so that two faces of a gauge can be ground without removing the gauge from said carrier.

2. A machine for grinding gauges, comprising a bed, a grinding wheel, means for supporting the grinding wheel in proximity to said bed, a gauge-carrier which is adapted to be detachably mounted on said bed and to slide thereon towards and from the grinding wheel, means for detachably securing a gauge to the carrier, means on said bed for guiding the gauge-carrier in its slidable movement towards and from the grinding wheel and for fixing the path of said movement, means for adjusting said guiding means so as to vary the position of the carrier on the bed and thereby effect fine adjustments of the face of the gauge being ground relatively to the grinding wheel, said carrier being freely removable from said bed in order to measure the gauge or for other purposes and replaceable thereon against said guiding means without disturbing the position of the gauge on the carrier and the path of movement of the latter towards and from the grinding wheel, and said carrier being invertible so that two faces of a gauge can be ground without removing the gauge from said carrier.

3. The machine claimed in claim 2 wherein the grinding wheel is supported on a turnable shaft, a bearing for said shaft, and means for adjusting said bearing and said shaft axially so that the coarse adjustment of the face of the gauge to be ground can be effected relatively to the grinding wheel.

4. A machine for grinding gauges, comprising a bed, a grinding wheel, means for turnably supporting the grinding wheel in proximity to said bed, a gauge-carrier which is adapted to be detachably mounted on said bed and to slide thereon towards and from the grinding wheel, means for detachably securing a gauge to the carrier, a wedge member for guiding the gauge-carrier in its movement towards and from the grinding wheel and for fixing the path of said movement, said wedge member being slidable on said bed towards and from the axis of the grinding wheel, an abutment on said bed for guiding the wedge member in its movement on the bed, means for attaching the wedge member to said abutment, and means for adjusting the wedge member towards and from the axis of the grinding wheel so as to vary the position of the carrier on the bed and thereby effect the fine adjustment of the face of the gauge to be ground relatively to the grinding wheel, said carrier being freely removable from said bed in order to measure the gauge or for other purposes and replaceable thereon against said wedge member without disturbing the position of the gauge on the carrier and the path of movement of the latter towards and from the grinding wheel.

5. The machine claimed in claim 4, wherein the said gauge-carrier is invertible so that two faces of a gauge can be ground without removing the gauge from said carrier.

6. The machine claimed in claim 4, wherein the grinding wheel is supported on a turnable shaft, a bearing for said shaft, and means for adjusting said bearing and said shaft axially so that the coarse adjustment of the face of the gauge to be ground can be effected relatively to the grinding wheel by the axial adjustment of said bearing and shaft.

7. A machine for grinding gauges, comprising a bed, a grinding wheel, means for turnably supporting the grinding wheel in proximity to said bed, a gauge-carrier which is adapted to be detachably mounted on said bed and to slide thereon towards and from the grinding wheel, means for detachably securing a gauge to the carrier, a wedge member adjustably mounted on said bed for guiding the carrier in its movements towards and from the axis of said grinding wheel, and for adjusting the carrier relatively to the part of the wheel by which the gauge is to be ground, and means for holding the gauge-carrier in contact with said wedge member during the sliding movement of the gauge-carrier towards and from the grinding wheel, said carrier being freely removable from said bed in order to measure the gauge or for other purposes and replaceable without disturbing the position of the gauge on the carrier and the path of movement of the latter towards and from the grinding wheel.

8. The machine claimed in claim 7, wherein the said gauge-carrier is invertible so that two faces of a gauge can be ground without removing the gauge from said carrier.

9. A machine for grinding gauges, comprising a bed, a grinding wheel, means for turnably supporting the wheel in proximity to said bed, a gauge-carrier which is adapted to be detachably mounted on said bed and to slide thereon towards and from the grinding wheel, means for detachably securing a gauge on said carrier, a wedge member for guiding the gauge-carrier in its slidable movements towards and from the grinding wheel, said wedge member having a carrier-guiding face which is disposed at a predetermined angle to the axis of the grinding wheel, and said carrier having at least one face adapted to be pressed against the said carrier-guiding face of the wedge member to guide the carrier in its movements towards and from the wheel, an abutment adjustably mounted on said bed, said abutment having one face which is inclined at an angle to said carrier-guiding face of said wedge and said wedge member having another face which is inclined to the carrier-guiding face, means for holding said other face of said wedge member in slidable contact with said inclined face of said abutment, means for adjusting the wedge member relatively to said abutment so as to effect the fine adjustment of the gauge-carrier and of the face of the gauge to be ground towards or from the part of the grinding wheel by which said face is to be ground, said carrier being freely removable from said bed in order to measure the gauge or for other purposes and replaceable without disturbing the position of the gauge on the carrier and the path of movement of the latter relatively to the grinding wheel.

10. A machine for grinding gauges, comprising a bed, a grinding wheel, means for turnably supporting the wheel in proximity to the bed, a saddle, means on the bed for guiding the saddle for movement thereon in a direction at a predetermined angle to the plane of the grinding wheel, a gauge-carrier, means for detachably securing a gauge to said carrier, means for guiding the gauge-carrier for slidable movement on the saddle towards and from the grinding wheel, a wedge member movably mounted on said bed for adjusting said saddle along the bed so as to effect adjustment of the face of the gauge to be ground relatively to the part of the grinding wheel by which the face is to be ground, said gauge-carrier being freely removable from said saddle in order to measure the gauge or for other purposes and replaceable without disturbing the position of the gauge on the carrier and the path of movement of the carrier towards and from the grinding wheel.

11. A machine for grinding gauges, comprising a bed, a grinding wheel, means for turnably supporting the wheel in proximity to the bed, a saddle, means on the bed for guiding the saddle for movement thereon in a direction at a predetermined angle to the plane of the grinding wheel, a gauge-carrier, means for detachably securing a gauge to said carrier, means for guiding the gauge-carrier for slidable movement on the saddle towards and from the grinding wheel, a wedge member movably mounted on said bed, an abutment for guiding the wedge member for movement towards and from the axis of the grinding wheel, means for adjusting the wedge member relatively to said abutment, and means on the saddle for contacting with the wedge member so that adjustment of the latter will move the saddle along the bed and thereby adjust the face of the gauge to be ground relatively to the part of the grinding wheel by which said face is to be ground, said gauge-carrier being freely removable from said saddle in order to measure the gauge or for other purposes and replaceable thereon without disturbing the position of the gauge on the carrier and the path of movement of the carrier towards and from the grinding wheel.

12. The machine claimed in claim 11, wherein means are provided for holding the said means on the saddle in contact with the wedge member in order to fix the relative positions of the face of the gauge to be ground and the grinding wheel during the grinding operation.

13. A machine for grinding gauges, comprising a bed, a grinding wheel, means for turnably supporting the wheel in proximity to the bed, a saddle, means on the bed for guiding the saddle for movement thereon in a direction at a predetermined angle to the plane of the grinding wheel, a gauge-carrier, means for detachably securing a gauge to said carrier, means for guiding the gauge-carrier for slidable movement on the saddle towards and from the grinding wheel, two wedge members movably mounted on said bed, one arranged on one side and one on the other side of said saddle, each said wedge member being adapted for use in adjusting the position of said saddle on the bed so as to effect adjustment of one face of the gauge to be ground relatively to the part of the grinding wheel by which said face is to be ground, said gauge-carrier being freely removable from said saddle in order to measure the gauge or for other purposes and replaceable thereon without disturbing the position of the gauge on the carrier and the path of movement of the carrier relatively to the grinding wheel.

14. A machine for grinding gauges, comprising a bed, a grinding wheel, means for turnably supporting the wheel in proximity to the bed, a saddle, means on the bed for guiding the saddle for movement thereon in a direction at a predetermined angle to the plane of the grinding wheel, a gauge-carrier, means for detachably securing a gauge to said carrier, means for guiding the gauge-carrier for slidable movement on the saddle towards and from the grinding wheel, two wedge members movably mounted on said bed, one on each side of said saddle, an abutment on said bed for guiding each wedge member, means for adjusting the latter, relatively to said abutment, and adjustable means on each side of said saddle adapted to contact with the wedge member on said side so that the adjustment of the wedge member will adjust the position of the saddle on the bed and thereby effect the adjustment of one face of the gauge relatively to the part of the grinding wheel by which said face is to be ground, said gauge-carrier being freely removable from said saddle in order to measure the gauge or for other purposes and replaceable thereon without disturbing the position of the gauge on the carrier and the path of movement of the latter towards and from the grinding wheel.

15. The machine claimed in claim 14, wherein the said adjustable means on said saddle comprises a member arranged for axial adjustment upon a stop member projecting from the saddle.

16. A machine for grinding gauges, comprising a grinding wheel, means for turnably supporting the grinding wheel, a gauge-carrier removably mounted on said machine and slidable thereon towards and from the grinding wheel, guiding means for guiding the gauge-carrier in its slidable movement and for fixing the path of said slidable movement, said guiding means including a guide adapted for simultaneous movements towards or from the axis of the grinding wheel and in a direction transversely to the plane of the wheel, means for effecting the simultaneous movements of said guide, and means for detachably securing a gauge to the carrier, said carrier being freely removable from said machine in order to measure the gauge or for other purposes and replaceable thereon against said guide without disturbing the position of the gauge on the carrier and the path of movement of the latter towards and from the grinding wheel.

17. A machine for grinding gauges, comprising a grinding wheel, means for turnably supporting the grinding wheel, a gauge-carrier removably mounted on said machine and slidable thereon towards and from the grinding wheel, means for detachably securing a gauge to the carrier, guiding means for guiding the gauge-carrier in its slidable movement and for fixing the path of said movement, said guiding means including a guide adapted for simultaneous movements towards or from the axis of the grinding wheel and in a direction transversely to the plane of the wheel, and means for adjusting said guide so as to effect the said simultaneous movements and so as to vary the path of movement of the carrier and thereby effect fine adjustments of the face of the gauge being ground relatively to the grinding wheel, said carrier being freely removable from said machine in order to measure the gauge or for other purposes and replaceable thereon against said guide without disturbing the position of the gauge on the carrier and the path of movement of the latter towards and from the grinding wheel.

18. The machine claimed in claim 16, wherein means are provided for holding the gauge-carrier against said guide during the sliding movements of the carrier towards and from the grinding wheel.

19. A machine for grinding gauges, comprising a bed, a grinding wheel, means for turnably supporting the wheel in proximity to the bed, a saddle, guiding means on the bed for guiding the saddle for movement thereon in a direction at a predetermined angle to the plane of the grinding wheel, adjustable means on said bed for adjusting said saddle on said guiding means, said adjustable means including a guide adapted for simultaneous movements towards or from the axis of the wheel and transversely to the plane of the wheel, means for effecting the simultaneous movements of said guide, a gauge carrier, means for detachably securing a gauge to said carrier, and means for guiding the gauge-carrier for slidable movement on the saddle towards and from the grinding wheel, said gauge carrier being freely removable from said saddle in order to measure the gauge or for other purposes and replaceable on the saddle without disturbing the position of the gauge on the carrier and the path of movement of the latter towards and from the grinding wheel.

20. A machine for grinding gauges, comprising a bed, a grinding wheel, means for turnably supporting the wheel in promixity to the bed, a saddle, guiding means on the bed for guiding the saddle for movement thereon in a direction at a predetermined angle to the plane of the grinding wheel, a gauge-carrier, means for detachably securing a gauge to said carrier, means for guiding the gauge-carrier for slidable movement on the saddle towards and from the grinding wheel, and adjustable means on said bed for adjusting said saddle on said saddle guiding means so as to effect adjustment of the face of the gauge to be ground relatively to the part of the grinding wheel by which the said face is to be ground, said adjustable means being adapted for simultaneous movements towards or from the axis of the wheel and also transversely of the plane of the wheel, and means for effecting the simultaneous movements of said guide, said gauge-carrier being freely removable from said saddle in order to measure the gauge or for other purposes and replaceable thereon without disturbing the position of the gauge on the carrier and the path of movement of the latter towards and from the grinding wheel.

PHILLIP GILBERT THOMAS.